United States Patent [19]

Aramaki et al.

[11] Patent Number: 4,698,477
[45] Date of Patent: Oct. 6, 1987

[54] ELECTRICAL DISCHARGE MACHINING APPARATUS WITH FORCED COOLING SYSTEM

[75] Inventors: Jun Aramaki; Toshiharu Karashima; Takuji Magara; Minoru Ushida, all of Aichi, Japan

[73] Assignee: Mitsubishi Denki Kabushiki Kaisha, Tokyo, Japan

[21] Appl. No.: 741,056

[22] Filed: Jun. 4, 1985

[30] Foreign Application Priority Data

Jun. 4, 1984 [JP] Japan .................................. 59-113138
Jun. 6, 1984 [JP] Japan .................................. 59-114464
Jun. 6, 1984 [JP] Japan .................................. 59-114465

[51] Int. Cl.⁴ .............................................. B23H 1/00
[52] U.S. Cl. ................................ 219/69 R; 219/69 E
[58] Field of Search ............... 219/69 R, 69 M, 69 E, 219/69 S, 69 G, 69 D; 62/DIG. 10; 82/DIG. 1

[56] References Cited

U.S. PATENT DOCUMENTS

| 2,379,932 | 7/1945 | Schoepflin et al. | 82/DIG. 1 |
| 2,385,665 | 9/1945 | Warwick | 219/69 V |
| 2,427,588 | 9/1947 | Burnett | 219/69 E |
| 2,502,907 | 4/1950 | Welte | 82/DIG. 1 |
| 2,676,277 | 4/1954 | Voll | 165/47 |
| 3,012,455 | 12/1961 | Kline | 82/DIG. 1 |
| 3,066,578 | 12/1962 | Olton | 82/DIG. 1 |
| 3,275,495 | 9/1966 | Lang | 165/47 |
| 3,786,223 | 1/1974 | O'Connor | 219/69 V |
| 4,220,015 | 9/1980 | Johansing, Jr. | 62/DIG. 10 |
| 4,359,085 | 11/1982 | Mueller | 62/DIG. 10 |
| 4,422,498 | 12/1983 | Chen | 165/47 |
| 4,427,908 | 1/1984 | Halmai | 165/47 |

FOREIGN PATENT DOCUMENTS

| 139828 | 10/1981 | Japan | 219/68 |
| 59-93238 | 5/1984 | Japan | 219/69 D |

Primary Examiner—M. H. Paschall
Assistant Examiner—Geoffrey S. Evans
Attorney, Agent, or Firm—Sughrue, Mion, Zinn, Macpeak and Seas

[57] ABSTRACT

An electrical discharge machining apparatus in which a workpiece is machined by generating an electrical discharge between the workpiece and a facing electrode immersed in a machining liquid. A blower is provided for forcing cooling air into the interior of a bed, a column, and a head of the apparatus to prevent thermal displacements between the electrode and the workpiece and thus ensure accurate machining. The blower may also be used to cool the machining liquid.

9 Claims, 21 Drawing Figures

FIG. 3 PRIOR ART (⇐ RELATIVE DISPLACEMENT)
(ROOM TEMP. INCREASED TO 18°C)

ELECTRICAL DISCHARGE MACHINING APPARATUS WITH FORCED COOLING SYSTEM

BACKGROUND OF THE INVENTION

The present invention relates to an improved electrical discharge machining apparatus for use particularly in precision machining in which displacement between the workpiece and the electrodes due to changes in machining power or environmental conditions is prevented.

Figure 1:
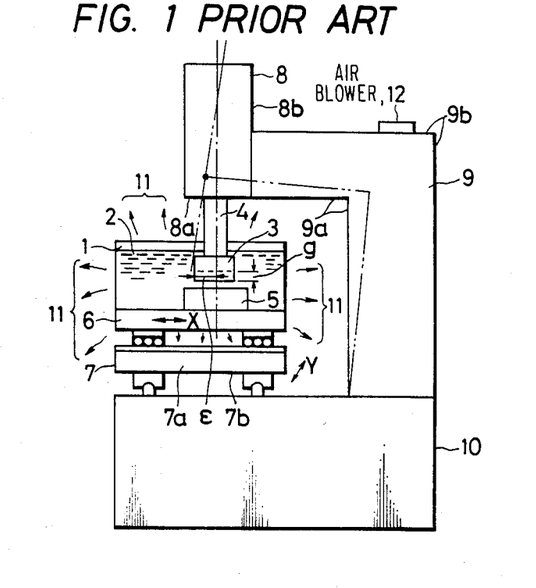
FIGS. 1 and 2 are schematic drawings showing the construction and depicting the operations of two separate examples of conventional electrical discharge machining apparatuses.

A conventional apparatus of the same general type to which the invention pertains is shown in FIG. 1. In this figure, reference numeral 1 indicates a machining tank, 2 a machining liquid, 3 an electrode, 4 a spindle for moving the electrode 3 in the vertical direction, 5 a workpiece, and 6 a table supporting the machining tank 1 and the workpiece 5, the table being movable in the X direction as indicated by an arrow in the figure. In the same figure, 7 represents a saddle on which the table 6 can be moved in the Y direction shown by an arrow in the figure, the Y direction being at a right angle to the X direction and together with the X direction defining the horizontal plane. Reference numeral 8 indicates a head within which the spindle 4 slides and is protected, 9 a column supporting the head 8, 9a the front side of the column, 9b the back side of the column, 10 a bed on which the column 9 is fixed and supported, and 12 an air blower fixed at the top of the column 9.

The following is a description of the operations of this unit. The workpiece 5 is machined by an electrical discharge generated between the electrode 3 and the workpiece 5 within the machining liquid 2 in the machining tank 1 when a voltage is applied from a power source (not shown in the drawing). Because of the discharge energy, the temperature of the machining liquid 2 rises, whereby the temperature of the machining tank 1, which is heated by the liquid, and that of the table 6, rise. The temperature increases gradually at a rate dependent on the machining power. Heat 11, which is radiated as shown by arrows in the figure, is generated from the surface of the machining liquid 2, the machining tank 1, and the table 6 because of their rise in temperature. Due to this radiated heat 11, the front surface 9a of the column which faces the heat source is heated, whereby the temperature of this surface rises also. Furthermore, because of the influence of the environment surrounding the electrical discharge machining apparatus, including the room temperature, the temperature distribution over different parts of the unit may change.

Thus, in the conventional electrical discharge machining apparatus constructed as described above, because the temperature of the components of the machine in thermal communication with the discharge source rises in comparison with other components, for example, as shown by a dot-and-dash line in FIG. 1, the spindle 4 and the front surface 9a of the column undergo thermal deformation, thereby displacing the electrode from its position at the beginning of the machining operation, leading to problems such as a lowering of machining accuracy.

Variation in temperature can also occur in response to changes in room temperature because of differences in heat capacities of the different components of the machining apparatus.

Furthermore, when electric discharge machining is carried out, the discharge energy causes the temperature of the electrode 3 and the machining liquid 2 to rise, the corresponding heat being transmitted to the spindle 4 which holds the electrode 3 in position. Since the spindle 4 is held by the head 8 via a bearing, a guide, etc., (not shown in the figure), heat in the spindle 4 cannot easily be transmitted to the head 8 and the column 9. Moreover, if electrical discharge machining is carried out in an environment where the room temperature can vary greatly, a difference of 2° to 5° C. can occur between the temperature of the column 9, which is exposed to the external atmosphere, and the spindle 4, which is held within the head 8. In this case, as electrical discharge machining of workpiece 5 continues, a difference in temperature is generated between the spindle 4 and the column 9 because of the variation in room temperature and machining heat, whereby a difference in thermal deformation (thermal expansion) occurs between the spindle 4 and the column 9 in the vertical direction, leading to a relative displacement g in the vertical direction between the electrode 3 and the workpiece 5, further decreasing the accuracy in the direction of depth of machining of the workpiece 5.

Figure 2:
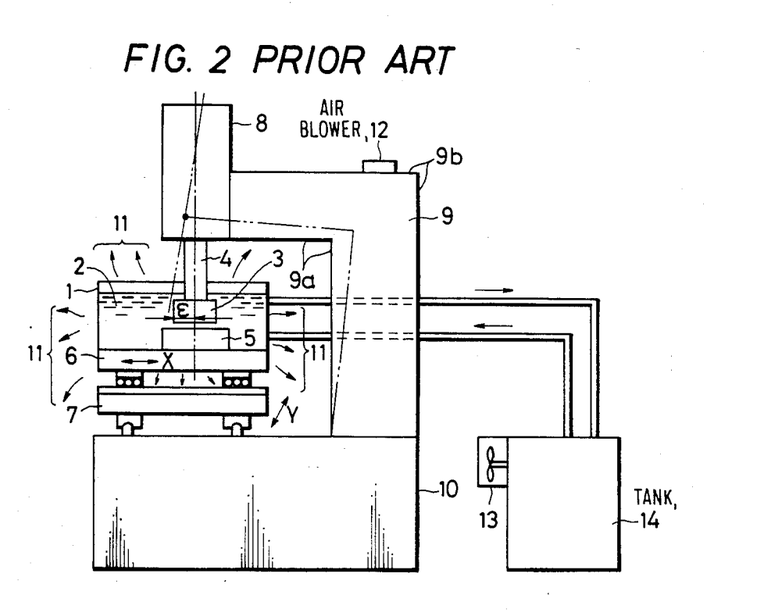

FIG. 2 illustrates another example of a conventional electrical discharge machining apparatus. Reference numerals in FIG. 2 used commonly in FIG. 1 denote like components. In FIG. 2, reference numeral 14 represents a machining liquid tank which is provided for circulation of machining liquid 2 in the machining tank 1. Reference numeral 13 designates a fan cooler used to regulate the temperature of the liquid. The fan 13, which blows air onto the machining liquid 2 in order to air cool it, is fixed to the machining liquid tank 14.

When electric discharge machining in the unit described above is performed, the temperature of the machining liquid 2 rises due to the discharged energy, and the rise in the liquid temperature heats the machining tank 1 and the table 2 so that the temperatures of the machining liquid 2, the machining tank 1, and the table 6 rise in comparison with the temperature of the ambient air. The fan cooler 13 cools the machining liquid in order to suppress the rise in its temperature. However, when the machining conditions have stabilized, a rise of 4° to 5° C. will have occurred in the machining liquid 2. Because of this, heat 11 is radiated as indicated by arrows in FIG. 2 from the surface of the machining liquid, the machining tank 1, and the table 6, each of which undergoes a rise in temperature. The radiated heat 11 also heats the front surface 9a of the column which faces the heat source. As a result, the temperatures of these surfaces rise, and the temperature distribution in the electrical discharge machining apparatus becomes nonuniform. As discussed above, variations in ambient conditions such as room temperature and the difference in thermal capacities of the respective components of the machining apparatus contribute to the nonuniform temperature distribution. Furthermore, local variations in temperature distribution in the column 9 arising due to the heating of the machining liquid 2 during machining and variations in the temperature distribution in the machining unit as a whole in response to changes in ambient conditions such as room temperature have different origins and occur independently of each other.

Accordingly, during electrical discharge machining operations in the conventional electrical discharge machining unit illustrated in FIG. 2, the temperature of the surfaces of the electrical discharge machining unit that face the heat source rises more than the surface temperatures elsewhere in the unit whereby, for example, as shown by the double-dot/dash line in FIG. 2, thermal deformation occurs on the front surface 9a of the column and the spindle 4, leading, as in the first instance, to relative displacement between the electrode 3 and the workpiece 5 in the vertical direction, causing defects such as a lowering of the machining accuracy of the workpiece 5. Also, when the machining liquid 2 is cooled by the fan cooler 13, the fan cooler 13 itself generates a rise of 4° to 5° C., whereby the precision of machining is still further adversely affected.

Figure 3:
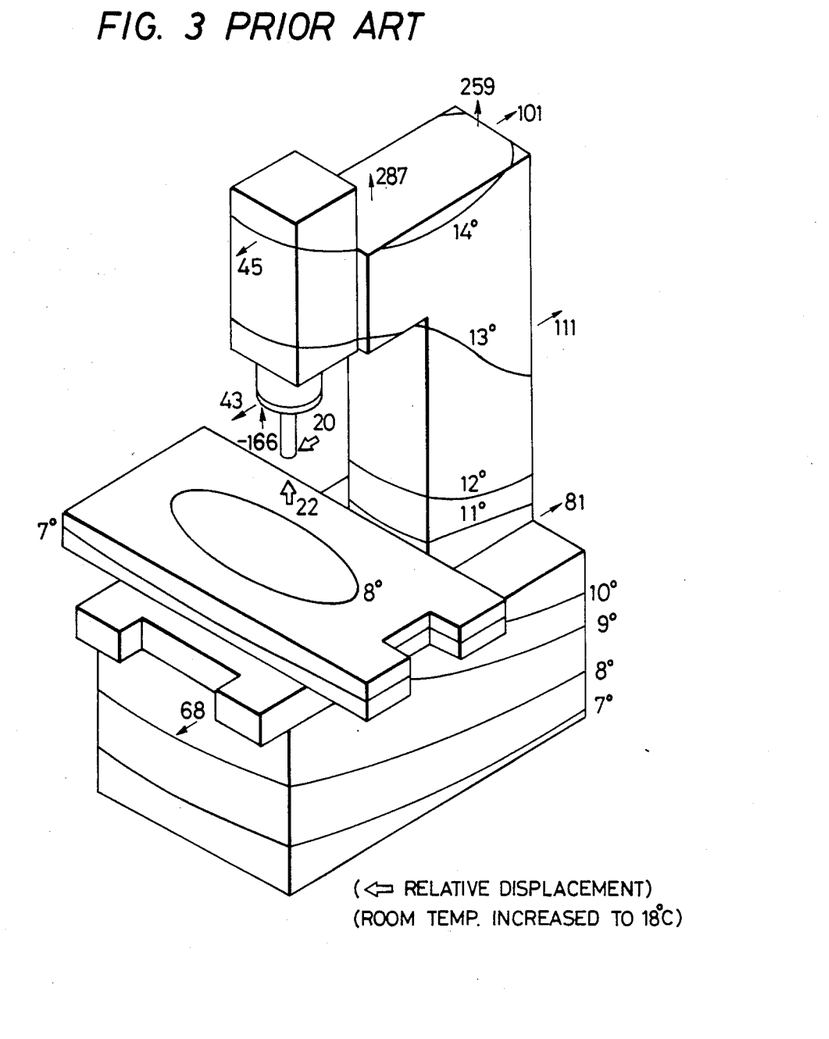
FIG. 3 is a perspective drawing showing measured values of temperature distribution and displacement in a machining apparatus in the case where ventilation is not sufficient within the apparatus.
Figure 4:
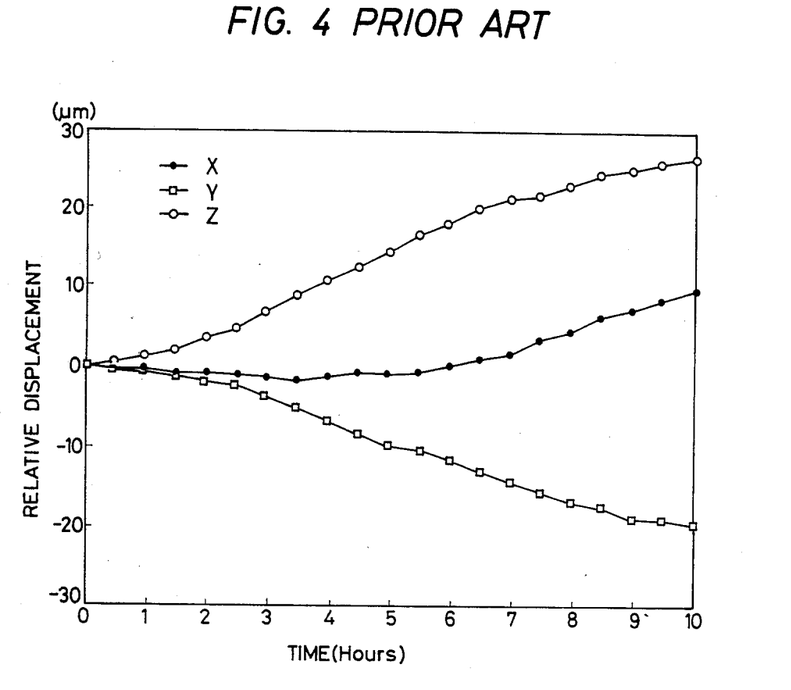
FIG. 4 is a chart showing the relative displacement between a machining electrode and a workpiece in X, Y, and Z directions over time due to variation in room temperature.
Figure 5:
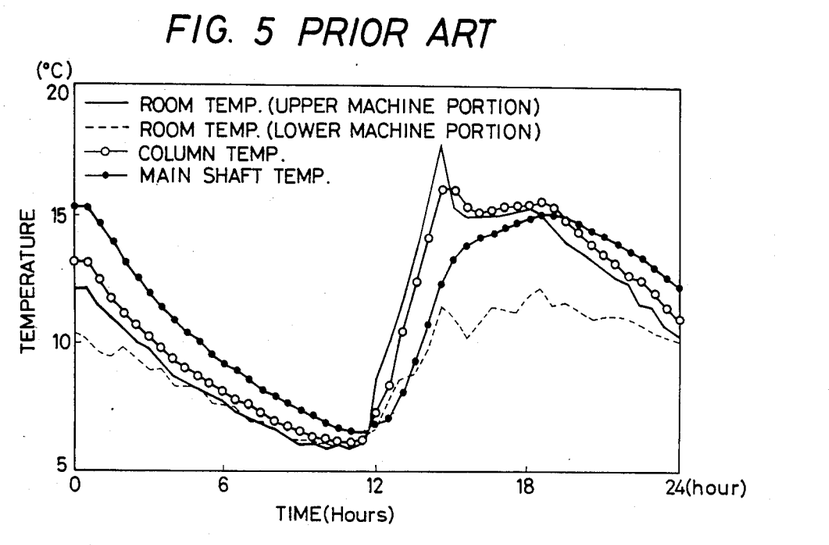
FIG. 5 is a chart showing variations over time of room temperature, column temperature, and spindle temperature in the conventional apparatuses illustrated in FIGS. 1 and 2.
Figure 6:
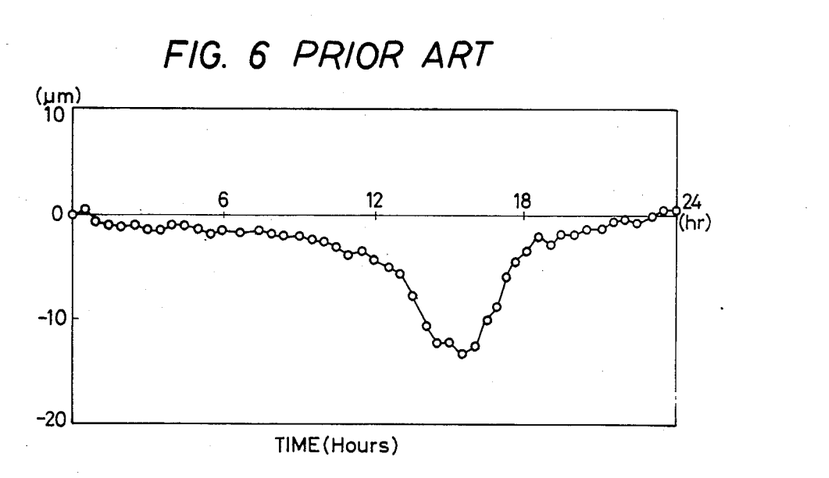
FIG. 6 is a chart showing variations over time of the relative displacement in the vertical direction between the electrode and the workpiece in the conventional apparatuses illustrated in FIGS. 1 and 2.

FIG. 3 shows a perspective view of a machining apparatus showing a measured distribution of temperature in the apparatus and the amount of the relative displacement between the machining electrode and the workpiece in a room where ventilation inside the machining apparatus is not sufficient. FIG. 4 shows variations in the relative position between the electrode 3 and the workpiece 5 over time as the room temperature changes, the differences in relative position being shown in mutually orthogonal X, Y, and Z directions. FIG. 5 is a chart showing the results of measurements of room temperature and the difference in temperatures at the spindle 4 and the column 9 while normal electrical discharge machining operations are being carried out, while FIG. 6 is a chart showing the results of measurements of the amount of mutual displacement in the vertical direction between the electrode 3 and the workpiece 5 under normal ambient variations over a 24-hour period.

In the conventional electrical discharge machining apparatus, the cooling fan, namely, the air blower 12, can be placed either on top of the column or at the back of the bed in order to blow atmospheric air so as to partially equalize the temperatures of the various components of the apparatus, but this has the defects that the paths of the air flow are not clearly known and only the interior of the machine structure is ventilated.

Furthermore, even if the machining unit is cooled by means of an air blower 12 fixed to the top of the column or at the back of the bed, because of the rise in temperature of the machining liquid 2 during normal operation, temperature differences occur among the workpiece 5, the table 6, and the saddle 7 (which faces the machining liquid 2), and the column 9, the bed 10, etc., cooled by the air blower 12. These differences in temperature afffect the temperature balance in the machining apparatus as a whole, and hence adversely affect the machining accuracy. In other words, during normal machining, components facing the machining liquid 2 eventually reach a temperature nearly as high as the temperature of the liquid itself, whereas the temperature of the other components remains near room temperature, and thus a difference in the amounts of thermal expansion occurs of the various components, which is a major cause of relative displacement between the machining electrode and workpiece. Since the measures applied in the conventional electrical discharge machining apparatus to overcome these difficulties were insufficient, the machining accuracy was insufficient in many cases.

SUMMARY OF THE INVENTION

Accordingly, an object of the invention is to eliminate the defects of the conventional apparatus described above.

These, as well as other objects of the invention, are met by an electrical discharge machining apparatus in which there is provided an air passage around the principal components of the apparatus so as to allow introduction of cooling air, thereby effectively cooling each component of the apparatus. In more detail, a cover is provided around principal components of the machining apparatus, and ambient air is forced into the interior of the apparatus by an air blower, thus causing air to circulate within the apparatus. The air flows from inside the apparatus into a passage formed by the external surfaces of the principal components of the apparatus and the cover, after which the air is expelled. Further, a fan is provided in the spindle so that the spindle is sufficiently air cooled. An air cooling may further be provided, which uses the discharge from the fan, which air cooling unit is used to cool the machining liquid.

BRIEF DESCRIPTION OF THE DRAWINGS

FIGS. 7A to 10B are schematic views illustrating the structure and operations of various examples of a machining apparatus of the invention;

DESCRIPTION OF THE PREFERRED EMBODIMENTS

The invention will now be described with reference to preferred embodiments.

Figure 7A:
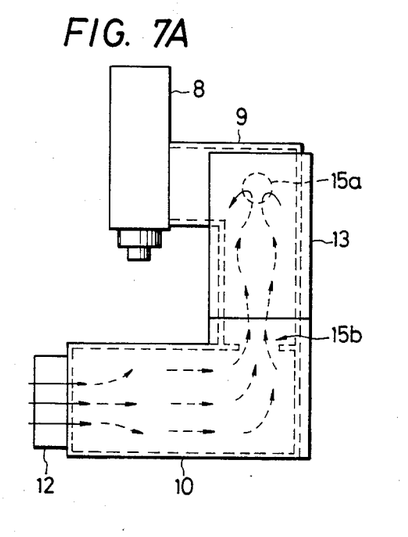
Figure 7B:
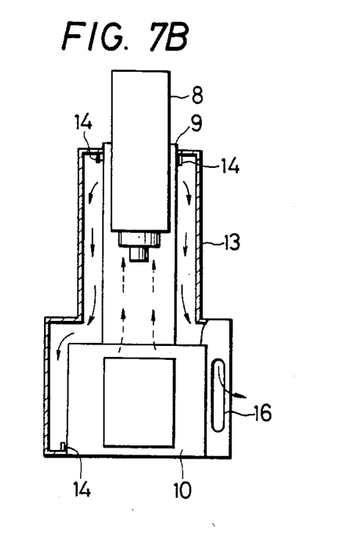

In FIGS. 7A and 7B, 8 represents a head; 9, a column; 10, a bed; 12, a motor driven blower fitted to the front of the bed; and 13, a ventilation cover fitted to column 9 and bed 10 covering, respectively, the front, back, and the sides of column 9 and the sides of bed 10. Reference numeral 14 indicates a packing provided to increase the airtightness of the area where the ventilation cover is fixed; 15a, a ventilation port provided at the side at the top of the column 9; 15b, a ventilation port provided at the juncture of the column 9 and bed 10; and 16, a discharge outlet provided in front of the ventilation cover 13.

The operation of this apparatus will now be described. As in the case of the apparatuses of FIGS. 1 and 2, when an electric discharge is generated between the electrode 3 and the workpiece 5, both being positioned within the machining liquid 2 contained in the machining tank 1, and the workpiece 5 is subjected to electrical discharge machining, the heat radiated from the heat source constituted by the machining liquid 2, machining tank 1, and table 6, heats the column 9, the bed 10, etc. Atmospheric air is supplied by the blower to the interior of the bed 10. After passing through the interior of bed 10, the air passes through the ventilation port 15b, the interior of the column 9, and the ventilation port 15a, and then passes into the space formed between the external surface of the column 9 and the ventilation cover 13. Atmospheric air flowing within the ventilation cover 13 passes in front of and along the sides of the column 9, then the sides of bed 10 and is discharged to the atmosphere through an outlet(s) 16. Thus, both the internal and the external surfaces of principal components, namely, the column 9 and the bed 10 of the machining unit, are cooled by the air supplied by blower 12, and hence the temperature distribution of the column 9 uniformly approaches the ambient temperature. As a result, the relative displacements e and g caused by thermal deformation in the machining unit are suppressed, and, furthermore, the temperatures of the various components of the machining apparatus approach uniformity, despite variations in ambient conditions such as room temperature and the strength of the sun's rays.

Figure 8A:
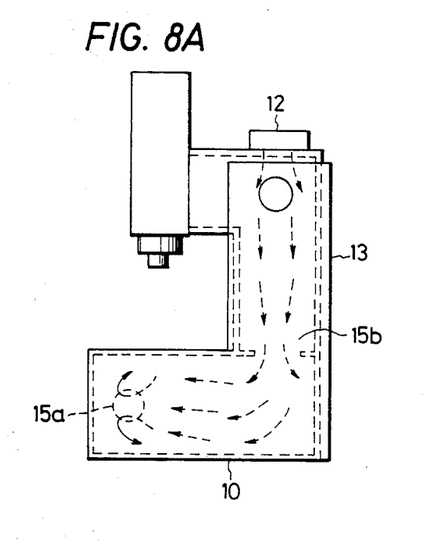
Figure 8B:
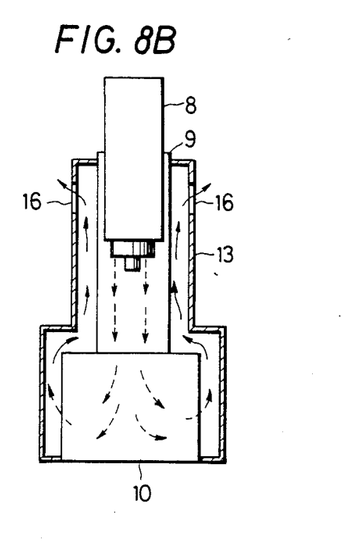
Figure 9A:
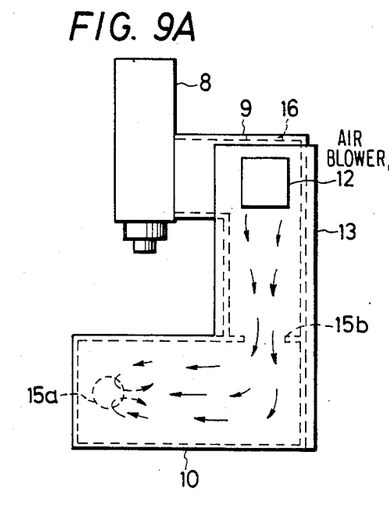
Figure 9B:
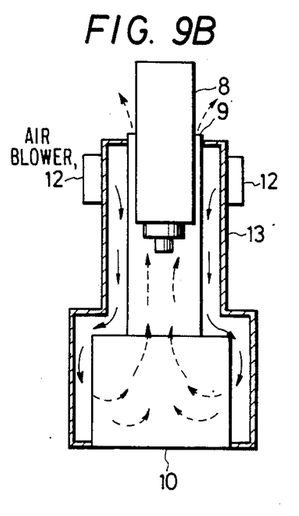
Figure 10A:
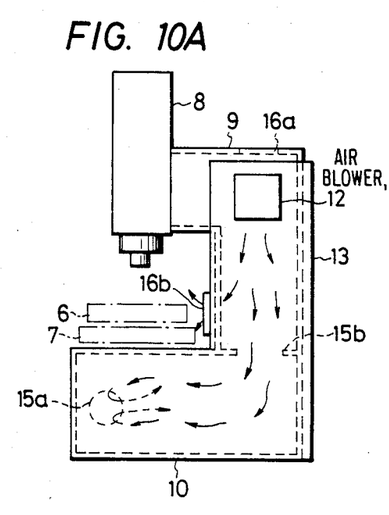
Figure 10B:
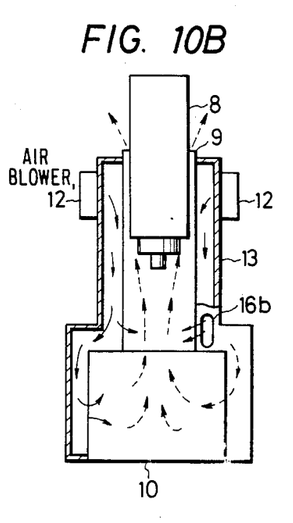
Figure 11:
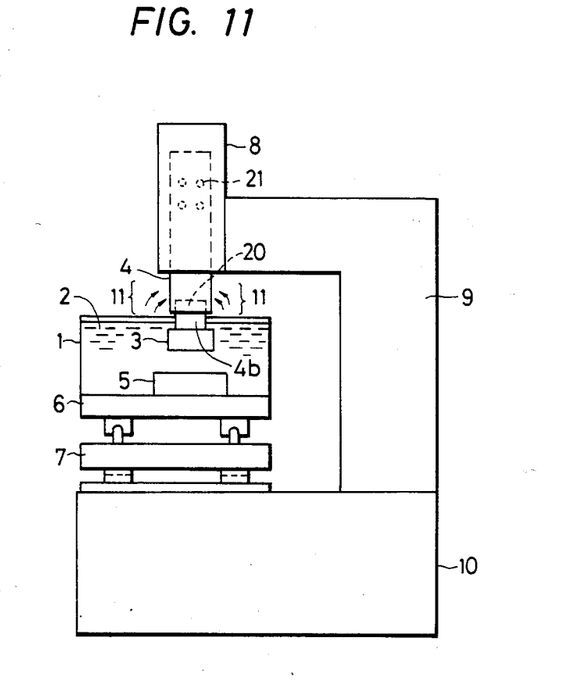
FIGS. 11 and 12 are schematic views showing still other embodiments of the invention.
Figure 12:
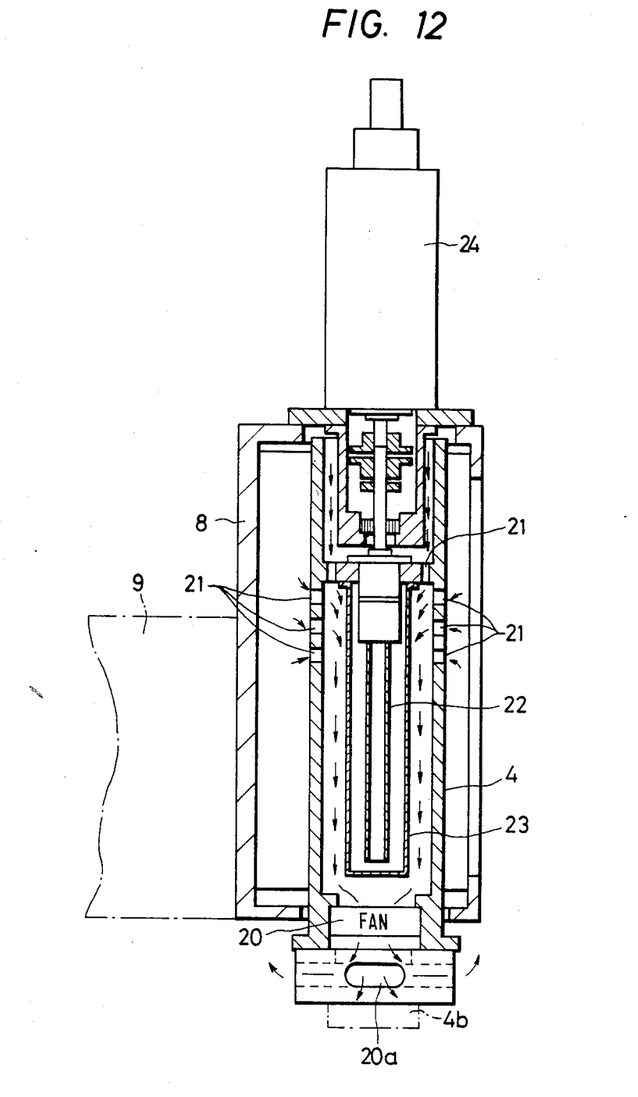

FIGS. 8A and 8B show another example of the invention in which the blower 12 is provided at the top of column 9 and a discharge outlet 16 at the top of ventilation cover, thereby supplying air into and discharging air from the top of the column 9. FIGS. 9A and 9B show a further example of the invention in which the blower 12 is provided in a ventilation cover 13 for providing air flow on the external sides of the column 9 and the bed 10. FIGS. 10A and 10B show one more example of the invention in which a second discharge outlet 16b is provided in that part of the ventilation cover 13 which faces the table 6 and the saddle 7 so that part of the discharged air cools the table 6 and the saddle 7, providing equivalent effects as in the example illustrated in FIGS. 7A and 7B. In the above examples, the blower 12 is directly fixed to the bed 10. However, a ventilation hose, a duct, etc., may be used in order to supply air from the outside. Furthermore, for better effects, two or more blowers may be provided. FIGS. 11 and 12 show still further examples of the invention in which the spindle 4 is cooled at its center.

In all these figures, reference numerals used commonly in FIG. 1 denote like components. Further, reference numeral 4b represents a clamp for the electrode 3, 20 a spindle ventilation fan provided at the bottom of the spindle 4, 20a a discharge outlet at the bottom of the spindle 4, and 21 ventilation ports provided in the spindle 4.

The cross-sectional view of FIG. 12 illustrates the internal structure of the spindle driving ball screw, a cover 23 protecting the spindle ball screw 22 from dust, and a spindle driving motor 24.

When workpiece 5 is subjected to electrical discharge machining by an electrical discharge generated between the electrode 3 and the workpiece 5, the heat generated by the machining energy is transmitted to the spindle 4 via the electrode 3. Howeve, a temperature difference between the spindle 4 and the column 9 is prevented by air continuously supplied to the interior of spindle 4 by the spindle ventilation port. Irrespective of variations in, for example, the room temperature, the spindle 4 and the column 9 remain more or less at the same temperature. For this reason, the thermal deformation (thermal expansion) of the spindle 4 and the column 9 in the vertical direction is identical, and almost no relative displacement g is generated in the vertical direction between the electrode 3 and the workpiece 5.

Figure 13:
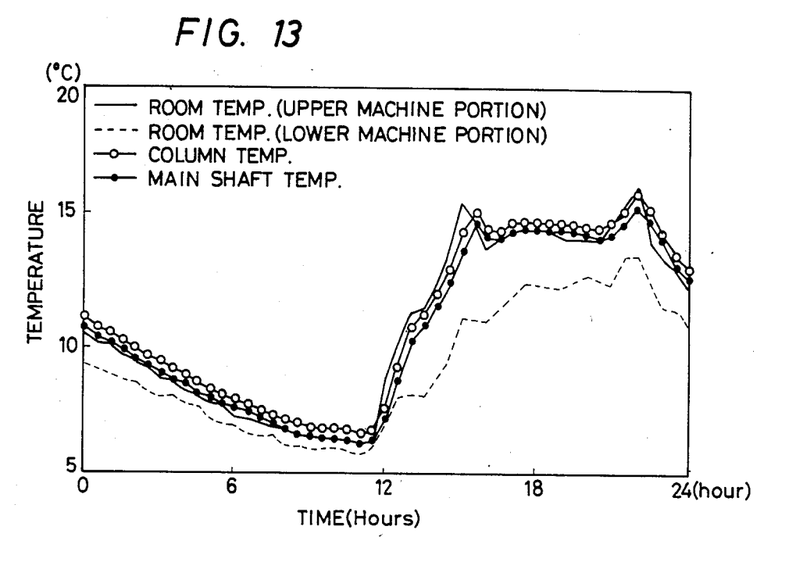
FIG. 13 is a chart showing variations over time in room temperature, column temperature, and spindle temperature for the examples illustrated in FIGS. 11 and 12.
Figure 14:
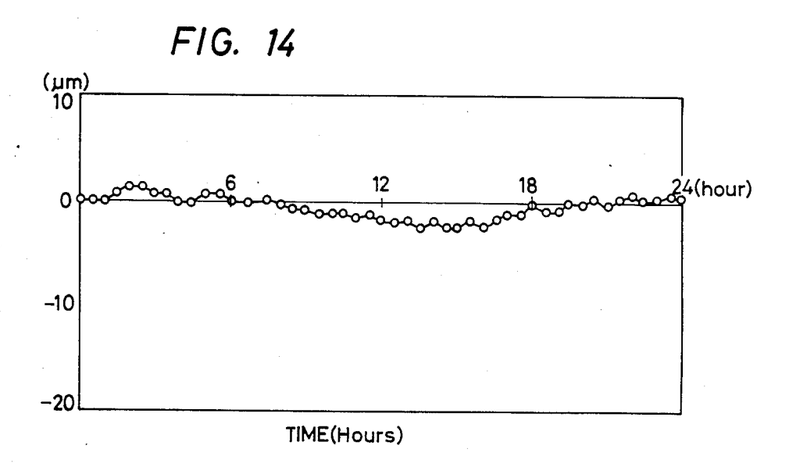
FIG. 14 is a chart showing variations over time of the relative displacement between the machining electrode and the workpiece in the examples illustrated in FIGS. 11 and 12.

FIG. 13 is a chart showing the results of measurements of the changes in relative displacement g in the vertical direction between the spindle 4 and the column 9. FIG. 14 is a chart showing the change over time of the relative displacement g in the vertical direction between the electrode 3 and workpiece 5. These figures amply illustrate the effects obtained by the examples of the invention.

Figure 15:
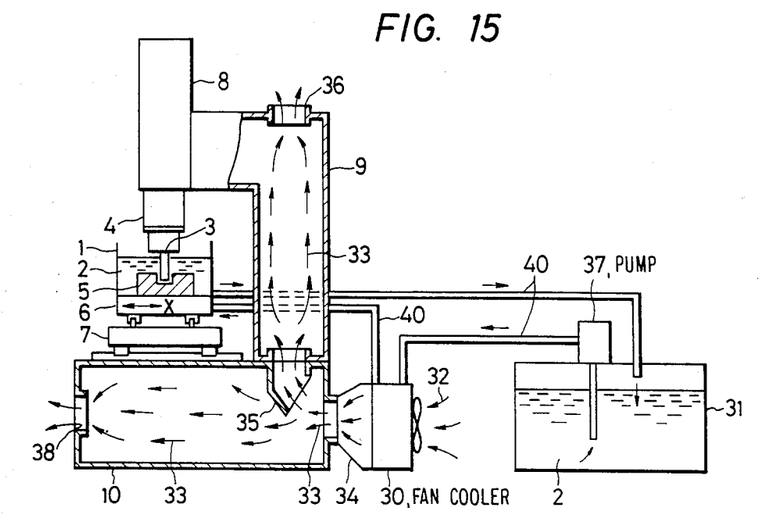
FIGS. 15 to 17 are schematic views showing further examples of the invention.

FIG. 15 illustrates another example of the invention. In this example, the fan cooler, which is used to cool the machining liquid, is used to supply cooling air. Reference numeral 30 indicates a fan cooler for cooling the machining liquid 2 with air, 31 a tank containing the machining liquid, 32 the suctioned air flowing to the fan cooler 30, 33 air discharged from fan cooler 30, 34 a fan cooler discharge duct, 35 a ventilation guide provided inside the bed 10, 36 and 38 discharge outlets provided in front of the top part of the column 9 and the bed 10, 37 a machining liquid supply pump, and 40 a pipe or hose for the passage of the machining liquid.

The following is a description of the operations performed by the structure illustrated in FIG. 15.

When the workpiece is subjected to electrical discharge between the electrode 3 and the workpiece 5, the machining energy increases the temperature of the machining liquid in the machining liquid tank 31. During the supply of the machining liquid 2 from the machining liquid tank 31 to the machining tank 1 by the machining liquid supply pump 37, the machining liquid at high temperature is cooled by the fan cooler 30 and then supplied to the machining tank 1. The heat energy lost by the machining liquid 2 because of the fan cooler intake 32 heats the fan cooler intake 32 itself and, therefore, the fan cooler exhaust, the temperature of which increases in comparison to the temperature of the fan cooler intake 32 by a value determined by the quantity of the exchanged heat, passes, with its temperature increased, through the fan cooler exhaust duct 34 into the interior of the bed 10 and the column 9, and is discharged from the exhaust outlet and 38 at the top of the column 9 and the front of bed 10. Accordingly, because cooled machining liquid 2 is supplied into the machining tank 1, despite the generation of a large quantity of machining energy, a rise in the temperature of the machining liquid 2 contained in the machining tank 1 is suppressed. As the rise in temperature of the machining liquid 2 is suppressed, a rise in the temperatures of the electrode 3, the sindle 4, the workpiece 5, the table 6, the saddle 7, and the head 8 due to the heat radiated from the machining tank 1 is suppressed greatly in comparison to the case where the fan cooler 30 is not provided.

Obviously, even though the rise in temperature of the electrode 3, etc., is suppressed, a slight rise of 2° to 5° C. takes place. However, since the fan cooler exhaust 33 passes into the column 9 and the bed 10, the difference in temperature between the electrode 3, the spindle 4, the workpiece 5, the table 6, the saddle 7, etc., and the column 9 and the bed 10 is reduced to a negligibly small value, whereby the temperature distribution over the entire electrical discharge machine unit is made more uniform.

Figure 16:
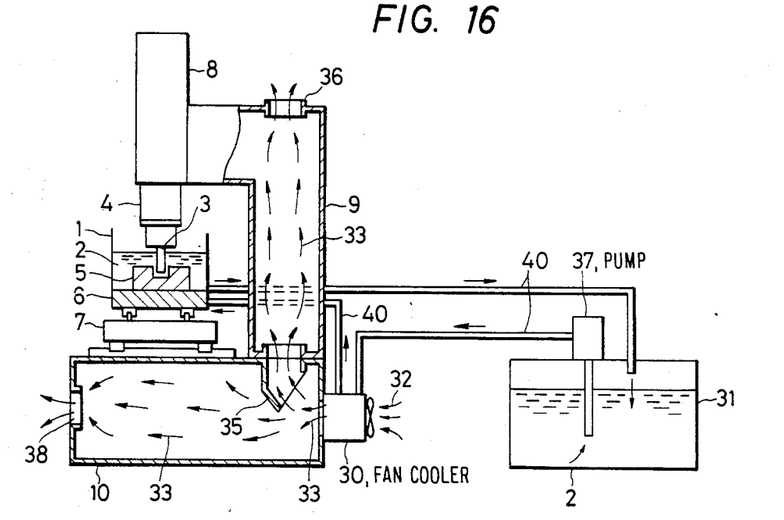

FIG. 16 illustrates another example of the electrical discharge machining unit in which the fan cooler 30 is directly installed on the bed 10. The effects attained in this instance are equivalent to those attained in the example illustrated in FIG. 15.

Figure 17:
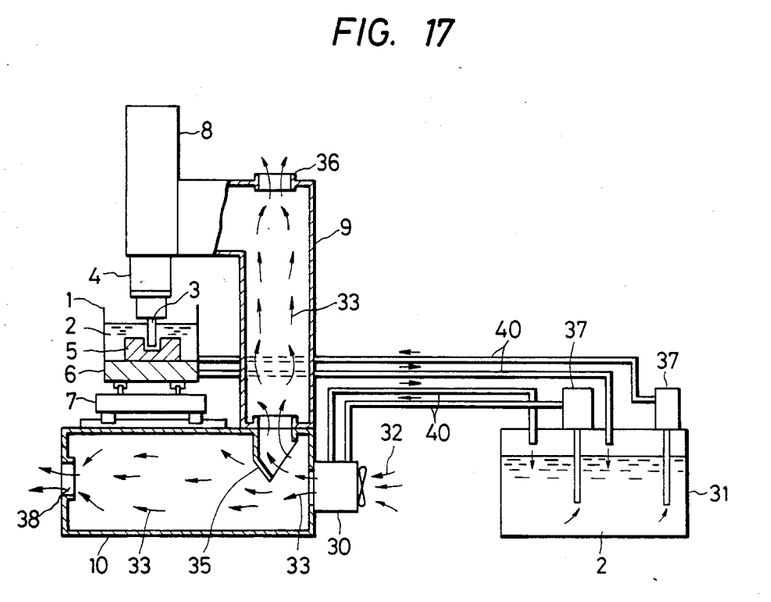

Furthermore, while in FIGS. 15 and 16 the fan cooler 30 is serially connected between the machining tank 1 and the machining liquid tank 31, identical effects may be obtained also by separately connecting the fan cooler 30 in a "parallel" manner as shown in FIG. 17. Furthermore, in place of one cooler 30, several fan coolers 30 may be used, thus making it possible to make further uniform the temperature in the entire electrical discharge machining unit.

As described above, because in the examples of the electrical discharge machining apparatus illustrated in FIGS. 15 and 17 exhaust from the fan cooler, the latter being used to cool the machining liquid, is used to ventilate parts which are not easily affected by the rise in temperature of the machining liquid, differences in temperature between parts affected by the rise in temperature of the machining liquid and the parts which are not easily affected by the rise in temperature of the machining liquid become small in comparison to the instances where no ventilation is carried out or where atmospheric air is used directly for ventilation. It is possible thereby to maintain the temperature balance of the entire electrical discharge machining unit, and thereby reduce the relative displacements between the electrode and the workpiece because of the difference in thermal deformation of the respective components of the apparatus, leading to electric discharge machining of considerably high accuracy. Furthermore, because a blower and a fan cooler are used side by side in the electrical discharge machining apparatus of the invention, the cost of the unit as a whole, and also noise, are reduced.

As described above, in the electrical discharge machining apparatus of the invention, the influence of heat from the heat sources constituted by the workpiece, the machining tank containing machining liquid, the table on which the machining tank and the workpiece are fixed, etc., on the machine structure is reduced, whereby relative displacement between the electrode and the workpiece because of the difference in thermal deformation of the machine structure is substantially eliminated. Even if there is a sudden change in room temperature or an upward or downward difference in temperature, the temperature in the electrical discharge machining apparatus can be quickly made uniform so that the same effects may be obtained with the invention, thereby maintaining a considerably high level of accuracy.

We claim:

1. An electrical discharge machining apparatus, comprising:
   (a) a hollow horizontal bed (10),
   (b) a machining tank (1) mounted on one end of the bed and containing a workpiece (5) immersed in a machining liquid (2),
   (c) a hollow vertical column (9) upstanding from another, opposite end of the bed,
   (d) means (15b) establishing communication between the hollow interiors of the bed and the column,
   (e) a head (8) outstanding from an upper portion of the column and disposed above the tank,
   (f) a spindle (4) carrying a machining electrode (3) facing the workpiece and mounted for axial movement within the head,
   (g) a cover member (13) surrounding outer surfaces of the bed and column and spaced from said outer surfaces to define an air flow passage therewith,
   (h) internal aperture means (15a) defined in one of the bed and the column at one end of the air flow passage for establishing communication between said hollow interiors and said passage, and
   (i) means (12, 16) disposed proximate another, opposite end of the air flow passage for forcing cooling air in a first direction through one of the hollow interiors and the air flow passage, through the internal aperture means, and in a second, opposite direction through another of the hollow interiors and air flow passage to minimize non-uniform thermal deformations in the apparatus and reduce attendant machining inaccuracies.

2. An apparatus according to claim 1, wherein said forcing means comprises air blower means (12) mounted to one of the air flow passage and the hollow interiors, and external aperture means (16) defined in another of the air flow passage and the hollow interiors.

3. An apparatus according to claim 2, wherein the blower means is mounted to the upper portion of the column, and the external aperture means are defined in a proximate portion of the cover member.

4. An apparatus according to claim 2, wherein the blower means is mounted to said one end of the bed, and the external aperture means are defined in a proximate portion of the cover member.

5. An apparatus according to claim 2, wherein the blower means comprises two air blowers individually mounted to opposite sides of the cover member proximate the upper portion of the column, and the external aperture means are defined in the upper portion of the column.

6. An apparatus according to claim 5, further comprising additional external aperture means (16b) defined in one of the cover member and the column proximate the machining tank for directing cooling air thereto.

7. An electrical discharge machining apparatus, comprising:
   (a) a horizontal bed (10),
   (b) a machining tank (1) mounted on one end of the bed and containing a workpiece (5) immersed in a machining liquid (2),
   (c) a vertical column (9) upstanding from another, opposite end of the bed,
   (d) a head (8) outstanding from an upper portion of the column and disposed above the tank,
   (e) an elongate hollow spindle (4) carrying a machining electrode (3) facing the workpiece and mounted for vertical axial movement within the head,
   (f) air inlet aperture means (21) defined in one of an upper portion of the spindle and a lower portion of the spindle,
   (g) air outlet aperture means (20a) defined in another of said upper portion of the spindle and said lower portion of the spindle,
   (h) forced air circulation means (20) for drawing cooling air into the hollow interior of the spindle through the inlet aperture means and discharging said air through the outlet aperture means to minimize thermal deformations in the apparatus due to heat radiating from the machining liquid and reduce attendant machining inaccuracies.

(i) a ball screw (22) provided within said spindle to drive said spindle, and (j) a dustproof cover (23) provided around said ball screw, a space between the external periphery of said cover and an internal periphery of said spindle defining an air space for said cooling air.

8. The apparatus as defined in claim 7, wherein said circulation means comprises a fan mounted in said lower portion of said spindle.

9. An electrical discharge machining apparatus, comprising:

(a) a hollow horizontal bed (10), (b) a machining tank (1) mounted on one end of the bed and containing a workpiece (5) immersed in a machining liquid (2), (c) a hollow vertical column (9) upstanding from another, opposite end of the bed, (d) means establishing communication between the hollow interiors of the bed and the column, (e) a head (8) outstanding from an upper portion of the column and disposed above the tank, (f) a spindle (4) carrying a machining electrode (3) facing the workpiece and mounted for axial movement within the head, (g) an external machining fluid circulation system (31, 37, 40) coupled to the tank, (h) a blower (30) for circulating air over a portion of the fluid circulation system to cool the machining fluid, and (i) means for circulating exhaust air from the blower through the hollow interiors of the bed and the column to minimize non-uniform thermal deformations in the apparatus and reduce attendant machining inaccuracies, wherein:

(1) the external machining fluid circulation system comprises a further tank (31), conduit means (40) coupling said further tank to the machining tank, and a pump (37) connected in the conduit means, (2) the blower is disposed to circulate air over the conduit means, (3) an exhaust outlet of the blower is coupled to an aperture in a wall of the bed, and the means for circulating exhaust air includes an outlet aperture (38) in an opposite wall of the bed and an outlet aperture (36) in the upper portion of the column, and (4) the communication establishing means comprises an air guide (35) disposed between the bed and the column for directing a portion of the blower exhaust into the column.

* * * * *